Figure 6:
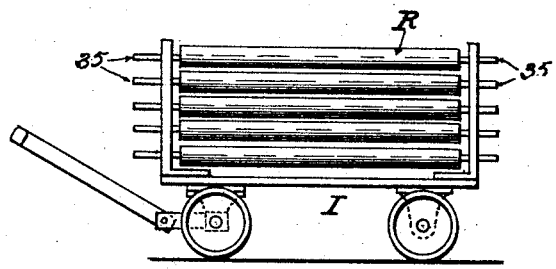

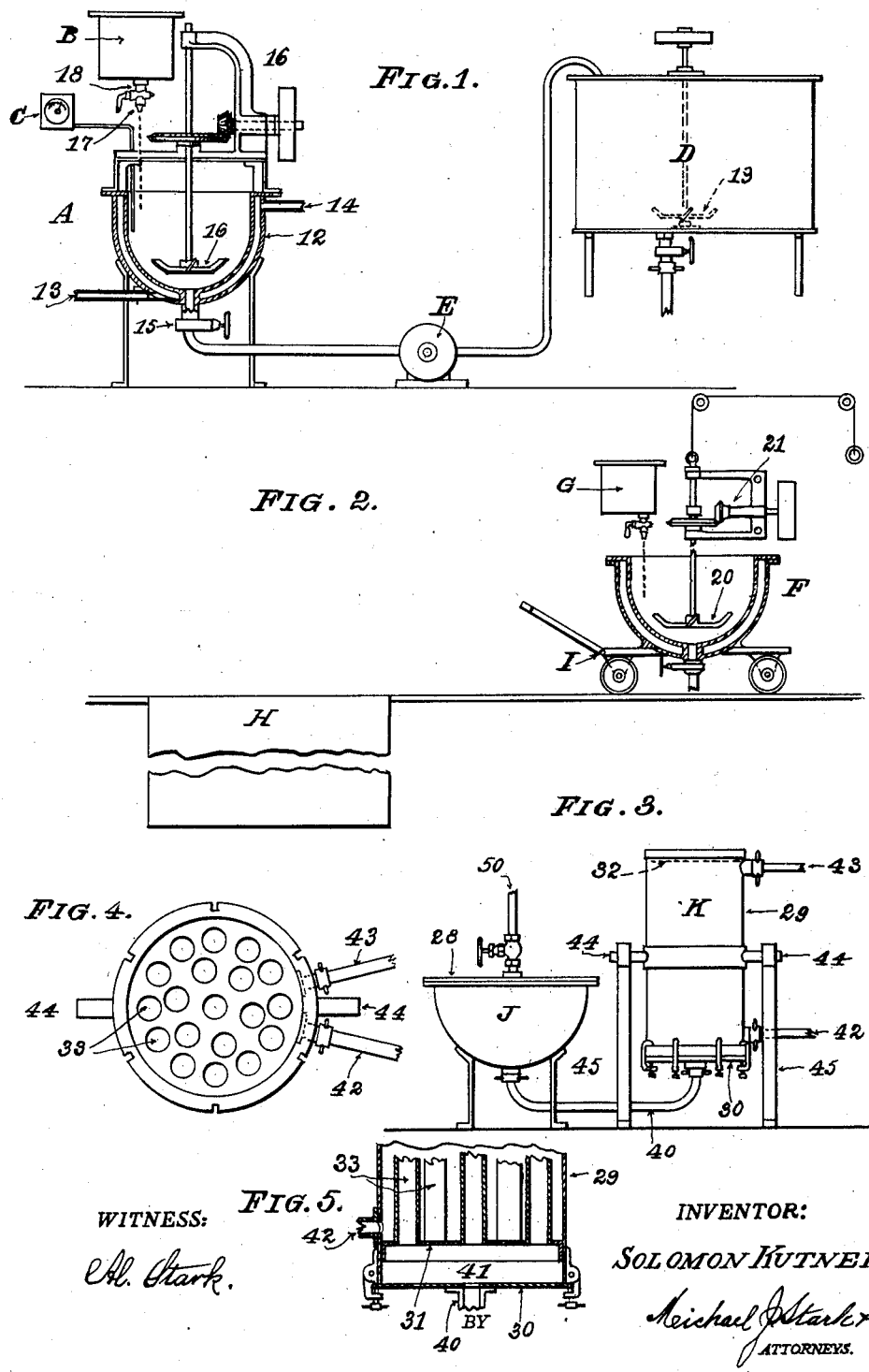

S. KUTNER.
ART OF MANUFACTURING PRINTERS' ROLLERS.
APPLICATION FILED JULY 26, 1919.

1,379,109.

Patented May 24, 1921.

2 SHEETS—SHEET 2.

WITNESS:
C. A. Stark

INVENTOR:
SOLOMON KUTNER,
BY Michael J. Stark & Sons
ATTORNEYS.

UNITED STATES PATENT OFFICE.

SOLOMON KUTNER, OF CHICAGO, ILLINOIS, ASSIGNOR, BY MESNE ASSIGNMENTS, TO RAPID ROLLER CO., OF CHICAGO, ILLINOIS, A CORPORATION OF ILLINOIS.

ART OF MANUFACTURING PRINTERS' ROLLERS.

1,379,109.  Specification of Letters Patent.  Patented May 24, 1921.

Application filed July 26, 1919. Serial No. 313,639.

*To all whom it may concern:*

Be it known that I, SOLOMON KUTNER, a citizen of the United States, and resident of the city of Chicago, in the county of Cook and State of Illinois, have invented certain new and useful Improvements in the Art of Manufacturing Printers' Rollers; and I do hereby declare that the following description of my invention, taken in connection with the accompanying sheets of drawings, form a full, clear, and exact specification, which will enable others skilled in the art to which the said invention appertains to make and use the same.

This invention has general reference to the art of manufacturing printers' rollers; and it consists, essentially, in the novel and peculiar method of producing the same; this application being, in part, a division of the application for Letters Patent of the United States, filed by me, April 11, 1919, Serial No. 289,327.

The object of this invention is the production of a highly efficient, serviceable, durable, and comparatively inexpensive roller for printers' and other uses.

In the drawings forming a part of this specification, and which illustrate the various apparatus and means by which my invention is carried into effect—

Figure 7:
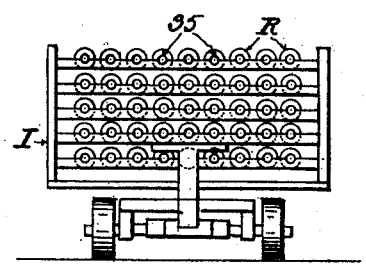
Figure 8:
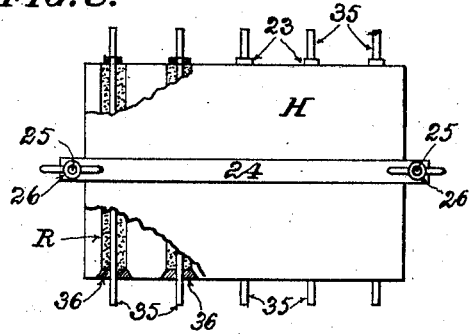
Figure 10:
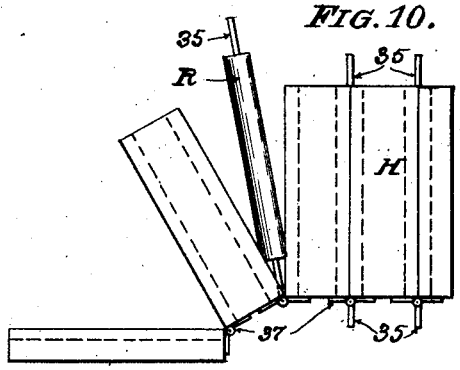
Figure 9:
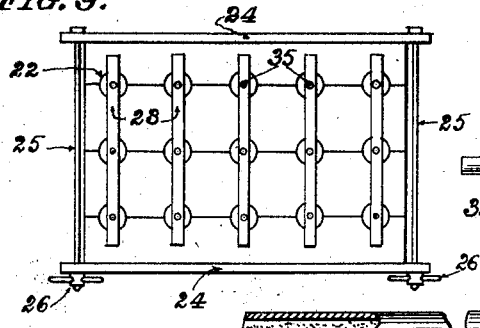
Figures 11, 12:
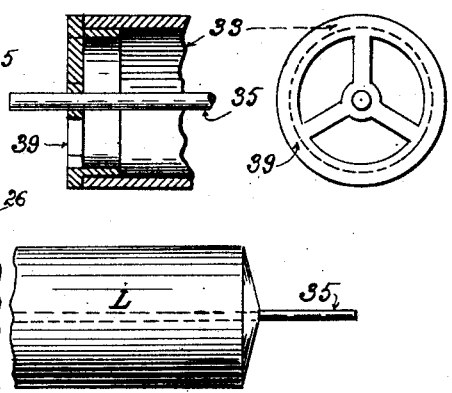
Figure 13:

Figure 1 is an elevation, partly in section, of the means by which I secure a stock composition, and the storage tank in which this stock composition is kept for future treatment and use. Fig. 2 is a similar view of the means by which the final roller composition is produced, and the mold in which the rollers are cast. Fig. 3 is a like view of the apparatus in which the core receives its exterior coating. Fig. 4 is a plan view of a part of the coating apparatus; and Fig. 5 is a sectional view of the lower portion thereof. Figs. 6 and 7 are views of the transporting truck. Figs. 8, 9, and 10, are views of the mold in which the cores are cast. Figs. 11 and 12 are views of the spider employed in centering the cores in the tubes or barrels of the Gatling gun. Fig. 13 is a view of the finished roller, a portion thereof being shown in section.

Like parts are indicated by the same symbols and characters of reference in all the various figures.

In practising this invention, I first produce a stock composition, consisting approximately, of 800 parts of a vegetable oil, such as corn oil, linseed oil, cotton seed oil, rape seed oil, and the like, and 15 parts of calcium oxid to which, after having been reduced to a powdered state, approximately 16% of water has been added to slightly moisten the lime, but not to entirely slake the same, and 12 parts of a mineral oil, commercially known as A. A. soap oil, and sold under that mark by the Standard Oil Co. and said to be a paraffin oil. These three ingredients I place into a kettle A, having a jacket 12, Fig. 1, which jacket has a water inlet 13 and an outlet or overflow 14 while the kettle has a discharge opening 15. In this kettle there is a stirrer 16, preferably driven by power from any suitable source. Adjacent this kettle A, I locate a tank or reservoir B, capable of holding a quantity of sulfuric chlorid; said tank B having a nozzle 17, and a regulating valve 18, the latter being so adjusted that the contents of the tank B are discharged drop by drop into the kettle A while the stirrer therein is being operated. This adding of the acid to the mass in the kettle evolves heat, and thus liberates chlorin gases which escape, thereby leaving the mass in the kettle in a partly vulcanized viscous consistence. Water is passed through the jacket in the kettle A to keep the temperature of the mass at approximately 85 degrees, Fah., which may be ascertained by a preferably recording thermometer C, and kept at this temperature by regulating the cold water supply accordingly. This agitation of the mass is kept up until gases cease to form, after which the mass is transferred to a storage tank D, preferably by a rotary pump E. In this storage tank the stock composition can be kept for a long time without having a deleterious effect upon the same. This storage tank is fitted with an agitator 19, which is slowly operated for the first 24 hours to eliminate from the mass any air bubbles that may have gathered therein.

When required for use in making the rollers, I proceed as follows:

I transfer from the storage tank a quantity of the stock composition into a portable jacketed kettle F, which is provided with a stirrer 20, the operating mechanism 21 of which is independent of the kettle so that the stirrer can be withdrawn from the kettle when the latter is being moved; and from a reservoir G, located above the kettle F, I drop into the stock composition a predetermined quantity of sulfur chlorid, to bring the temperature in the kettle high enough to completely vulcanize the mass and to flow readily from the kettle F.

In this connection I will state that the necessity of forming first a stock composition is dictated by expediency so as to always have a sufficient quantity of material on hand for instant use when required, and for the reason that the after-treatment of the stock composition varies according to the uses to which the rollers are to be put, and which is regulated by the quantity of acid which is added to the stock composition, and which determines the degree of vulcanization of the composition, and is ascertained by trials.

The average proportions of the stock composition and the sulfur chlorid added thereto are approximately 100 parts of the stock composition, and 10 parts of the sulfur chlorid.

The kettle F is mounted on a truck I, and after having received its quota of composition is moved over a series of molds H, shown in detail in Figs. 8, 9, and 10, and the cavities 22, in these molds filled from this kettle F, after the rods 35 have been located therein. These molds may be of any desired construction. preference being given to the construction shown, and including a series of the cavities 22 of proper diameter and length formed in the corners of, preferably wooden blocks, which are held together by straps 24, and tie rods 25, having handled nuts 26 for convenience in manipulating these nuts. Across the top of these molds are placed bars 23, which are punctured to receive one end of the rods 25, on which the roller will afterward rotate, and to properly center these rods in the mold cavities, the lower ends of these cavities being closed by plugs 36, which have a central bore to permit the passage of the lower ends of said rods 35. The mold sections are, preferably, hingedly connected at their lower ends, as at 27, so that the molds can be readily opened to remove the rollers therefrom. In these molds the rollers are permitted to solidify which will generally require from 15 to 40 minutes.

A roller, R, thus far completed is capable of being used in various arts where a very elastic and resilient roller is required, such as feeding rolls, and the like, but is not suitable for use as a printing roller. To adapt this roller for use as a printing roller, I apply thereto an outer coating L, of a composition, such as has been in use for printing rollers for many years the composition of which is well known; and this coating I apply to the roller, which in this case forms a core, in the following manner:

A sufficient quantity of the covering composition is placed into a kettle J, having a closable cover 28, to which a pipe 50, is connected through which steam, or air under pressure may be admitted to the kettle J. Adjacent this kettle J, there is located an apparatus K, which is known to the art as a Gatling gun, being a cylindrical shell 29, having at one end a removable cover 30, and above this cover a diaphragm or false bottom 31, and near the other end a second, similar false bottom 32, both false bottoms being perforated and receiving tubes 33, of an internal diameter corresponding to that of the finished roller. The cores coming from the molds are preferably stacked upon a truck I, illustrated in Figs. 6 and 7, and the truck moved to the Gatling gun and the cores removed from the truck and pushed into the tubes 33, there being first placed upon the journal ends 35 of the cores, spiders 39, by which the cores are properly centered in the tubes. The bottom 30 of the gun K is then closed and connection between the gun and the kettle J established, preferably by a hose 40, so that when fluid pressure is applied to the contents of the kettle J, its contents will be forced through the hose into the space 41 between the cover 30 and the false bottom 31, and then rise in the tubes 33, until it reaches the upper end thereof. Warm water is admitted to the shell 29 by an inlet tube 42, and surrounding the tubes 33, to escape at the outlet 43, at the upper end of the shell 29, the object of which is to heat the tubes sufficiently to permit the flowing of the composition in the tubes without overheating the cores therein and to cause the covering to intimately adhere to the cores. When the tubes are all filled, cold water is admitted to the gun to rapidly cool the now finished rollers, so that they may be discharged from the tubes by opening the cover 30, and cutting off the coating substance in the space 41.

In order to facilitate the placing of the cores into the tubes 33, the shell 29 is provided with trunnions 44, which are rotatably mounted in standards 45, and the shell turned to horizontal position after which the shell is closed and rotated to vertical position and the connection between the shell and the kettle J established. In this connection I will state that the external diameter of the core is approximately $\frac{1}{4}$ of an inch less than the bores of the tubes 33, so that the coating thereof is about $\frac{1}{8}$ of an inch in thickness.

The covering of the core will readily take printers' ink, but has the slight disadvantage that it will slightly harden in course of time, which, however does not affect the efficiency of my improved roller, owing to its extreme resiliency and elasticity of its core, and its non-drying and non-hardening qualities.

The apparatus hereinbefore described and illustrated in the drawings is especially adapted for production in large quantities; but it is evident that the process described can be carried on on a smaller scale with comparatively simple appliances, without departing from the scope of my invention.

Having thus fully described this invention I claim as new, and desire to secure to myself by Letters Patent of the United States—

1. The hereindescribed method of making an inking roller for a printing press which consists in preparing a self-vulcanizing compound in semi-liquid form for the production of a roll core, filling a suitable mold with the semi-liquid, allowing sufficient time for the liquid to become solidified by self-vulcanization, removing the solidified core from the mold and covering the outer surface of the core with a non-vulcanized coating of resilient material, as and for the purpose specified.

2. The herein described method of making an inking roller for a printing press, which consists in applying a self-vulcanizable compound in a semi-liquid state to the roller shaft to form a core for the roller, allowing the core to solidify by self-vulcanization and without the application of heat and then applying an outer coating of appreciable thickness to the core, said outer coating being non-vulcanizable, substantially as described.

3. An inking roller for a printing press comprising a core of resilient material carried by the shaft of the roller said core material being of a nature to be self-vulcanized without the application of heat, and a layer of non-vulcanized material covering the cylindrical surface of the core, substantially as described.

4. An inking roller for a printing press, comprising a core of resilient vulcanized material composed mainly of a vegetable oil, and an outer coating or covering of non-vulcanized material joined to the core to form a unitary structure and composed mainly of glue and glycerin, substantially as described.

In testimony that I claim the foregoing as my invention, I have hereunto set my hand.

SOLOMON KUTNER.